Dec. 3, 1940.  W. H. HAUPT ET AL  2,224,077
SHUTTER FOR X-RAY APPARATUS AND THE LIKE
Filed Dec. 18, 1939  3 Sheets-Sheet 1

WALTER H. HAUPT
HADEN S. WARE  INVENTORS
CHESTER TIETIG
BY Chester Tietig
ATTORNEY.

WALTER H. HAUPT
HADEN S. WARE
CHESTER TIETIG
INVENTORS
BY Chester Tietig
ATTORNEY.

Dec. 3, 1940.   W. H. HAUPT ET AL   2,224,077
SHUTTER FOR X-RAY APPARATUS AND THE LIKE
Filed Dec. 18, 1939   3 Sheets-Sheet 3
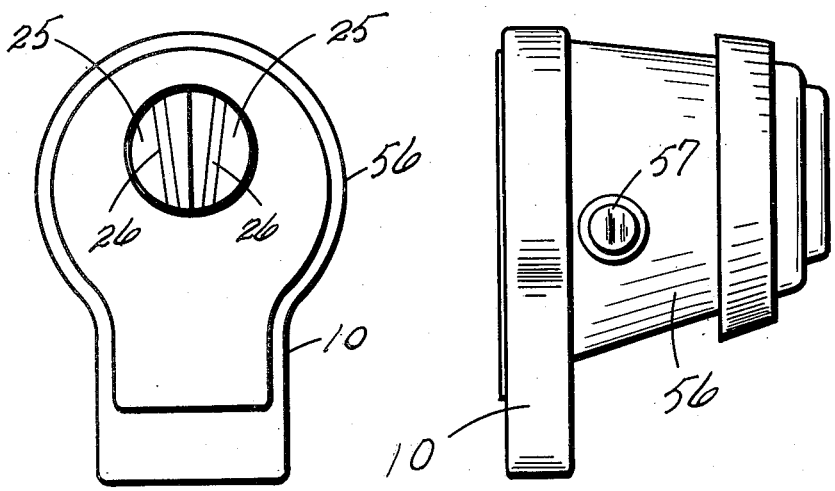
INVENTORS
WALTER H. HAUPT
BY HADEN S. WARE
CHESTER TIETIG
Chester Tietig ATTORNEY.

Patented Dec. 3, 1940

2,224,077

UNITED STATES PATENT OFFICE 2,224,077

SHUTTER FOR X-RAY APPARATUS AND THE LIKE

Walter H. Haupt, Ludlow, Haden S. Ware, Fort Mitchell, and Chester Tietig, Covington, Ky., assignors to The Kelley-Koett Manufacturing Company, Incorporated, Covington, Ky., a corporation of Ohio Application December 18, 1939, Serial No. 309,764

8 Claims. (Cl. 250—105)

This invention relates to a shutter mechanism for X-ray apparatus. It is especially intended for industrial radiography, such as the examination of heavy castings or forgings, welds, etc., but may also be applied to general X-ray use, as well as to photographic apparatus in general or to searchlights. Among the objects of the invention is the provision of a shutter which will operate smoothly and surely regardless of its position.

Another object is the provision of mechanism which when it receives a short actuating impulse will convert such impulse into a swift and comprehensive movement of the actual shutter.

A third object is the provision of a set of convenient and efficient electromagnetic controls to enable the shutter to be surely and swiftly actuated by remote control. Other advantages will be apparent to those skilled in the art from the following description.

In the drawings,

Figure 5 is a front view of a searchlight or X-ray head, showing our shutter in position. In this view the shutter is closed.

Figure 6 is a side view of an X-ray head or searchlight such as is also shown in Figure 5.

Figure 4:
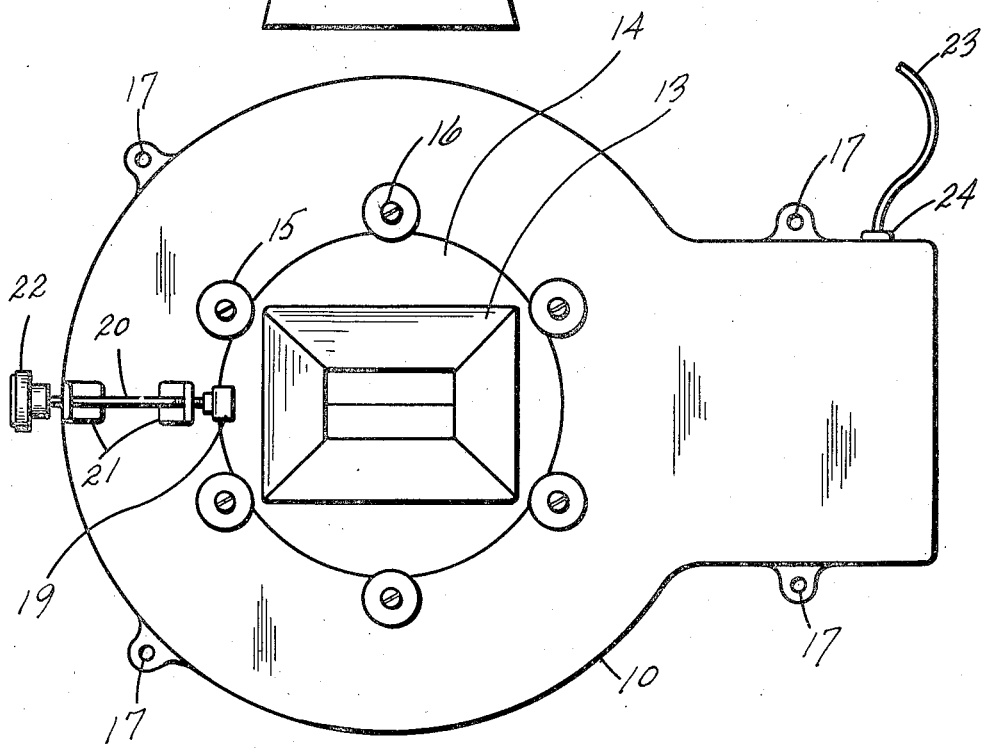
Figure 4 is a plan view of the shutter and its associated case, this view being taken from the approximate position which is to be occupied by the X-ray tube.

In the drawings 10 is a generally keyhole-shaped case housing the shutter and its associated mechanism. Its floor 11 is X-ray-proof except for a circular orifice 12 through which the beam for the inspection of castings, etc., is to be directed. This orifice is preferably provided with a ray-directing cone 13 which may be built in pyramidal shape as shown in Figure 4. The cone 13 is attached to an X-ray-proof plate 14 which is mounted by means of a plurality of revoluble spools 15 which are in turn attached to studs 16 which are attached to the floor of the case 10. Consequently the plate 14 can be rotated and the X-ray beam changed so that its longer dimension can be directed to the place formerly occupied by its shorter dimension. This feature is of convenience in inspecting welds or seams.

For locking the rotation of plate 14 there is provided a lock of the conventional pin type which is mounted upon a shaft 20 which extends through lugs 21 which are mounted on the bottom of case 10. A knob 22 is attached to shaft 20 whereby the latter may be slid in or out to lock plate 14 and cone 13.

An insulated wire 23 from a source of electric power is conducted through an insulator 24 in the side of the rectangular portion of case 10, said wire conducting current for the actuation of electromagnets within the case.

The entire assembly of case 10 and its enclosed mechanism and cone 13 is attached by means of bolts 17 or other fastenings to the shock-proof head 18 of a large X-ray apparatus. Customarily such a head contains the X-ray tube and its associated transformers, all of which are immersed in insulating oil.

Referring now only to Figures 1 and 2, 25 to 35 inclusive are parts of a mechanism of bi-lateral symmetry, so that the right-hand series of the parts bearing these numbers are followed by (a). The left-hand series is plain. 25—25a are each semi-circular ray-obstructing elements of the shutter. They are each mounted upon a flat strut 26 which is in turn mounted upon a projection 27 of a casting 28 each of which supports a gear 29 which is adapted to rotate about a shaft 30. Each of these gears is in constant mesh with the other.

Figures 1, 2:
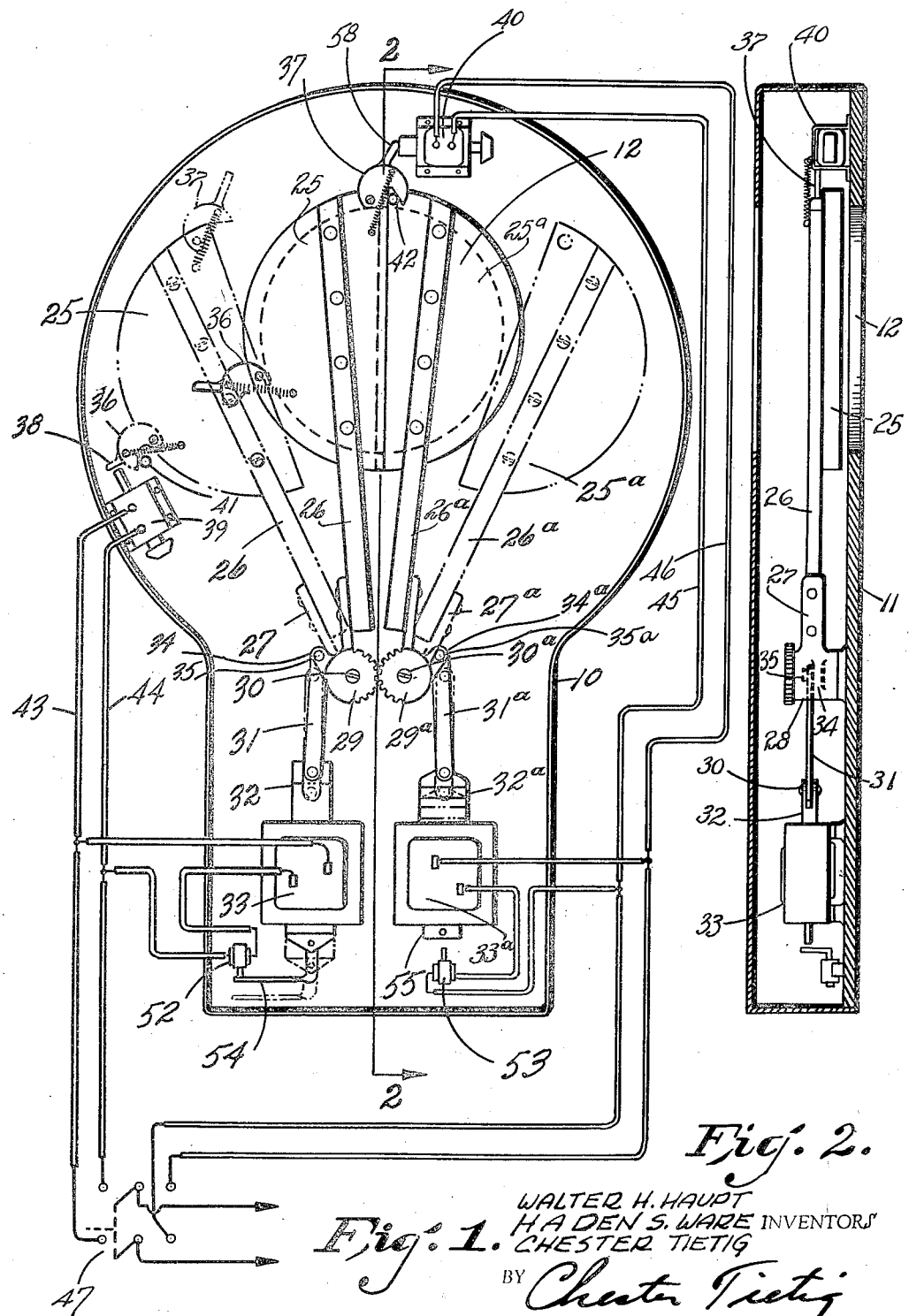
Figure 1 is a plan view of the shutter and its associated mechanism, the cover of its case being removed.
Figure 2 is a sectional view taken along the line 2—2 of Figure 1. This figure shows the major connections of the electrical circuit.
Figure 3:
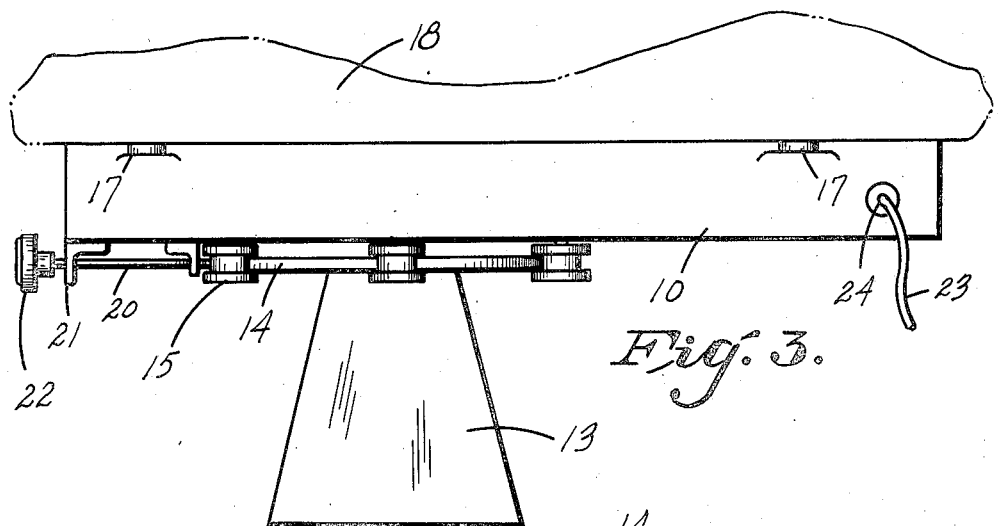
Figure 3 is a side elevation of our shutter within its case, the complete assembly being attached to an X-ray head and bearing an X-ray directing cone.

A pair of links 31 are pivotably attached to one side of casting 28 as shown in Figure 2. The rearward ends of said links being also pivotably mounted in the core 32 of a solenoid 33. The core of each of said solenoids is adapted to be moved simultaneously with its mate but not to be simultaneously actuated. The solenoids 33 are each in communication with the source of power through wire 23. Their links 31 are attached to the gears 29 by means of crank lugs 34 to which they are pivoted by pivots 35.

When the shutter halves 25 are open, as shown by their delineation in dotted line, the orifice 12 is freely open to the passage of the X-ray beam. When the shutter halves are closed over orifice 12, they meet in overlapping relation as indicated by dotted line in Figure 1, so that the passage of substantially all X-rays through them is prevented.

The electrical system is arranged as follows:

36 and 37 are pivoted, spring-pressed latches attached to left hand shutter element 25. Latch 36 is attached at the left side of the shutter element while latch 37 is attached at the tip. Each latch is provided with a projecting lug or trigger 38 with which the core of a solenoid may make contact. 39 is the solenoid controlling latch 36 and solenoid 40 controls latch 37. Latch 36 locks to a pin 41 set vertically into case 10, while latch 37 locks on a pin 42 set vertically into the tip of right hand shutter element 25.

Solenoid 39 and left hand solenoid 33 are connected and solenoid 40 and right hand solenoid 33 are likewise in parallel by means of leads 45 and 46. Each such pair of solenoids is therefore simultaneously actuable by the throwing of a double pole double throw switch 47. All four solenoids cannot, however, be actuated at the same time.

The operation therefore is that when switch 47 is closed to the left, solenoid 39 unlatches latch 36 by pushing on trigger 38 and simultaneously left hand solenoid 33 pushes on left hand lug 34, rotating both gears 29 to bring the shutter elements 25 together. At this time latch 37 automatically closes over pin 42 to hold the shutter closed.

It will be observed that the two solenoids 33 are oppositely arranged. Therefore when switch 47 is closed to the right, the right hand solenoid 33 transmits a pull to right hand lug 34 and solenoid 40 pushes latch 37 open. Shutter elements 25 are then forced apart in unison until the limit of opening is reached when latch 36 closes over pin 41, thereby holding shutters 25 open.

As shown in Figure 1 it lies within the scope of the invention to provide a pair of limit switches 52 and 53 mounted upon the case below solenoids 33. The purpose of these switches is to disconnect the solenoids 33 automatically and as soon as the ray obstructing elements 25 reach their completely open or completely shut positions. Both mechanical and electrical stress upon the mechanism is avoided by the use of such switches.

It will be noted that the lefthand or closing solenoid 33 is provided with a bent trigger 54 adapted to engage limit switch 52 at the end of the pushing motion of said solenoid and trigger. By such means the current to the pushing solenoid 33 is interrupted and its motion arrested. The limit switches are of the type in which the contacts are pressed into engagement by a spring. Suitable mercury switches are equivalent.

The lefthand limit switch 53 is adapted to be engaged by the end 55 of the solenoid core 32 at the end of its shutter opening motion, the result of which is to turn off the current on right-hand solenoid 33. In the appended claims, the phrase "and the like", is intended to include searchlights.

In Figures 5 and 6, 56 is intended to represent either a searchlight or X-ray head, 57 being one of a pair of trunnions upon which the searchlight or X-ray head is pivoted.

We claim as our invention:

1. In a shutter for X-ray apparatus and the like, a case adapted to be attached to such apparatus, said case having an opening for the passage of rays therethrough, mechanism within said case comprising a pair of ray-obstructing elements movable substantially parallel to the plane of said opening, a strut for each of said ray-obstructing elements supporting the latter within said case, a pair of intermeshing gears pivoted within said case substantially at and attached to that end of said struts which is furthest from said opening and remotely controlled means for rotating said gears whereby to bring together said ray-obstructing elements over said opening and thereby prevent the emergence of rays from said case.

2. In a shutter for X-ray apparatus and the like, a case adapted to be attached to such apparatus, said case having an opening for the passage of rays therethrough, mechanism within said case comprising a pair of substantially flat ray-obstructing elements movable substantially parallel to the plane of said opening and together capable of closing the latter, a strut for each of said ray-obstructing elements supporting the latter within said case, a pair of intermeshing spur gears pivoted within said case substantially each gear being at and attached to that end of its strut which is furthest from said opening, lugs on said gears and remotely controlled means for rotating said gears said means comprising a solenoid connected to one of said gears through said lugs whereby to bring together said ray-obstructing elements over said opening and thereby prevent the emergence of rays from said case.

3. In a shutter for X-ray apparatus and the like, a case adapted to be attached to such apparatus, said case having an opening for the passage of rays therethrough, mechanism within said case comprising a pair of substantially flat ray-obstructing elements movable substantially parallel to the plane of said opening and together capable of closing the latter, a strut for each of said ray-obstructing elements supporting the latter within said case, a pair of intermeshing spur gears pivoted within said case each gear being substantially at and attached to that end of its strut which is furthest from said opening, lugs on said gears and remotely controlled means for rotating said gears, said means comprising a pair of solenoids each connected to one of said gears through one of said lugs whereby to bring together said ray-obstructing elements over said opening and thereby prevent the emergence of rays from said case, one of said solenoids being arranged to exert its force to open said shutter and the other to close it.

4. In a shutter for X-ray apparatus and the like, a case adapted to be attached to such apparatus, said case having an opening for the passage of rays, mechanism within said case comprising a pair of substantially flat semicircular ray-obstructing elements movable substantially parallel to the plane of said opening and together capable of closing the latter, a strut for each of said ray-obstructing elements supporting the latter within said case, a pair of intermeshing spur gears pivoted within said case each gear being substantially at and attached to that end of that strut which is furthest from said opening, lugs on said gears, remotely controlled means for rotating said gears, said means comprising a pair of solenoids each connected to one of said gears through one of said lugs whereby to bring together said ray-obstructing elements over said opening and thereby prevent the emergence of rays from said case, one of said solenoids being arranged to exert its force to open said shutter and the other to close it, and a pair of electromagnetically controlled latches, one thereof being adapted to hold said ray-obstructing elements in open position and one thereof being adapted to hold said elements in shut position and an electric circuit including a double-pole, double-throw reversing switch, a parallel reverse connection between said solenoids and latches, whereby upon closing said double-pole, double-throw switch upon the one side, the open-holding latch is energized when the closing solenoid is energized and upon closing said switch to the other side, the shut-holding latch is energized simultaneously with the opening solenoid.

5. In a shutter for X-ray apparatus and the like, a case adapted to be attached to such apparatus, said case having an opening for the passage of rays, mechanism within said case comprising a pair of substantially flat ray-obstructing elements movable substantially parallel to the plane of said opening and together capable of closing the latter, a strut for each of said ray-obstructing elements supporting the latter within said case, a pair of intermeshing spur gears pivoted within said case each gear being substantially at and attached to that end of its strut which is furthest from said opening, lugs on said gears, remotely controlled means for rotating said gears, said means comprising a pair of solenoids each connected to one of said gears through one of said lugs whereby to bring together said ray-obstructing elements over said opening and thereby prevent the emergence of rays from said case, one of said solenoids being arranged to exert its force to open said shutter and the other to close it, and a pair of limit switches, one of which is arranged to de-energize the opening solenoid when the ray-obstructing elements have reached their fully open position, and the other to de-energize the closing solenoid when the ray-obstructing elements reach the closed position.

6. In a shutter for X-ray apparatus and the like, a case adapted to be attached to such apparatus, said case having an opening for the passage of rays, mechanism within said case comprising a pair of substantially flat ray-obstructing elements movable substantially parallel to the plane of said opening and together capable of closing the latter, a strut for each of said ray-obstructing elements supporting the latter within said case, a pair of intermeshing spur gears pivoted within said case each gear being substantially at and attached to that end of its strut which is furthest from said opening, lugs on said gears, remotely controlled means for rotating said gears, said means comprising a pair of solenoids each connected to one of said gears through one of said lugs whereby to bring together said ray-obstructing elements over said opening and thereby prevent the emergence of rays from said case, one of said solenoids being arranged to exert its force to open said shutter and the other to close it, and a pair of limit switches, one of which is arranged to de-energize the opening solenoid when the ray-obstructing elements have reached their fully open position, and the other to de-energize the closing solenoid when the ray-obstructing elements reach the closed position.

7. In a shutter for X-ray apparatus and the like a plurality of ray-obstructing elements, strut means adapted to pivot said ray-obstructing means about substantially common points and to bring said ray-obstructing elements together to block a bundle of rays, intermeshing spur gears to which said strut means are attached, said spur gears being located at said pivot points, separate solenoid means connected to each of said gears for rotating the latter to actuate said ray-obstructing means, the solenoids of said means being adapted to push one of said gears to rotate the latter, the other solenoid being adapted to pull the other of said gears to rotate it in a direction opposite to that of the first gear, whereby to open and shut the ray-obstructing elements in separate operations initiated by different solenoids, a latch adapted to hold one of said ray-obstructing means open in a position whereby it does not obstruct the bundle of rays, a second latch adapted to hold both of said ray-obstructing means shut in a position in which they obstruct the bundle of rays, two solenoids each adapted to actuate one of said latches, and an electric circuit comprising a connection in parallel between the solenoid serving the latch holding the ray-obstructing elements shut and the solenoid arranged to separate the said ray-obstructing elements on the one hand, and a connection in parallel between the solenoid serving the latch adapted to hold the ray-obstructing elements open and the solenoid adapted to bring them together, on the other hand, whereby the ray-obstructing-element-separating action and the action of bringing said elements together are each electrically combined with an appropriate latch unlocking action to allow the opening or closing of the shutter to take place selectively.

8. A shutter according to claim 7 and in addition a limit switch in the electric circuit arranged in a position to be operated by the opening solenoid at the approximate end of its travel to open position to de-energize the said solenoid and a second limit switch in the electric circuit arranged in a position to be operated by the closing solenoid at the approximate end of its closing travel to de-energize said solenoid.

WALTER H. HAUPT.
HADEN S. WARE.
CHESTER TIETIG.